(12) United States Patent
Engelhardt

(10) Patent No.: US 6,906,312 B2
(45) Date of Patent: Jun. 14, 2005

(54) SCANNING MICROSCOPE HAVING A MICROSCOPE STAND

(75) Inventor: Johann Engelhardt, Bad Schoenborn (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 237 days.

(21) Appl. No.: 10/417,663

(22) Filed: Apr. 17, 2003

(65) Prior Publication Data

US 2003/0197119 A1 Oct. 23, 2003

(30) Foreign Application Priority Data

Apr. 19, 2002 (DE) ..................................... 202 06 153 U

(51) Int. Cl.[7] .............................. H01J 3/14; H01J 40/14; H01J 5/16
(52) U.S. Cl. ....................................... 250/234; 359/368
(58) Field of Search .............................. 250/234, 201.3, 250/458.1; 359/368, 380, 381, 432

(56) References Cited

U.S. PATENT DOCUMENTS

| | | | | |
|---|---|---|---|---|
| 4,597,644 A | * | 7/1986 | Schindl | ....................... 359/363 |
| 4,959,552 A | * | 9/1990 | Saffert et al. | ........... 250/559.26 |
| 5,287,219 A | * | 2/1994 | Hildebrand et al. | ......... 359/368 |
| 5,535,052 A | * | 7/1996 | Jorgens | ....................... 359/388 |
| 6,169,289 B1 | | 1/2001 | White et al. | ............. 250/458.1 |

OTHER PUBLICATIONS

David W. Piston et al., "Two–Photon–Excitation Fluorescence Imaging of Three–Dimensional Calcium–Ion Activity", Applied Optics, vol. 33, No. 4, Feb. 1, 1994, pp. 662–669.

David. W. Piston et al., "Time–Resolved Fluorescence Imaging and Background Rejection by Two–Photon Excitation in Laser Scanning Microscopy", SPIE vol. 1640 Time–Resolved Laser Spectroscopy in Biochemistry III (1992) pp. 379–389.

* cited by examiner

Primary Examiner—Thanh X. Luu
Assistant Examiner—Seung C. Sohn
(74) Attorney, Agent, or Firm—Davidson, Davidson & Kappel, LLC

(57) ABSTRACT

A scanning microscope has a microscope stand and a light source that emits an illuminating light beam for illumination of a sample. The illuminating light beam is scanned over a sample with a beam deflection device, arranged in the microscope stand. A Bauernfeind prism is arranged between the sample and the detector for deflecting the detection light out of the microscope beam.

7 Claims, 2 Drawing Sheets

SCANNING MICROSCOPE HAVING A MICROSCOPE STAND

CROSS REFERENCE TO RELATED APPLICATIONS

This application claims priority to German utility model application 202 06 153.1, which is hereby incorporated by reference herein.

FIELD OF THE INVENTION

The invention concerns a scanning microscope having a microscope stand; having a light source that emits an illuminating light beam for illumination of a sample; having a beam deflection device, arranged in the microscope stand, for scanning the illuminating light beam over the sample; having an objective that focuses the illuminating light beam onto the sample; and having at least one detector that receives detection light proceeding from the sample.

BACKGROUND OF THE INVENTION

In scanning microscopy, a sample is illuminated with a light beam in order to observe the detection light emitted, as reflected or fluorescent light, from the sample. The focus of an illuminating light beam is moved in a sample plane by means of a controllable beam deflection device, generally by tilting two mirrors; the deflection axes are usually perpendicular to one another, so that one mirror deflects in the X direction and the other in the Y direction. Tilting of the mirrors is brought about, for example, by means of galvanometer positioning elements. The power level of the detection light coming from the specimen is measured as a function of the position of the scanning beam. The positioning elements are usually equipped with sensors to ascertain the present mirror position.

In confocal scanning microscopy specifically, a specimen is scanned in three dimensions with the focus of a light beam.

A confocal scanning microscope generally comprises a light source, a focusing optical system with which the light of the source is focused onto a diaphragm (called the "excitation pinhole"), a beam splitter, a beam deflection device for beam control, a microscope optical system, a detection pinhole, and the detectors for detecting the detected or fluorescent light. The illuminating light is coupled in via a beam splitter. The fluorescent or reflected light coming from the specimen travels back through the beam deflection device to the beam splitter, passes through it, and is then focused onto the detection pinhole behind which the detectors are located. This detection arrangement is called a "descan" arrangement. Detection light that does not derive directly from the focus region takes a different light path and does not pass through the detection pinhole, so that a point datum is obtained which results, by sequential scanning of the specimen with the focus of the illuminating light beam, in a three-dimensional image. A three-dimensional image is usually achieved by acquiring image data in layers. Commercial scanning microscopes usually comprise a scanning module that is flange-mounted onto the stand of a conventional light microscope, the scanning module containing all the aforesaid elements additionally necessary for scanning a sample.

Commercial scanning microscopes usually contain a microscope stand such as the one also used in conventional light microscopy. Confocal scanning microscopes, in particular, are usually also usable as conventional light microscopes. In conventional fluorescent incident-light microscopy, the component of the light of a light source, for example an arc lamp, that contains the desired wavelength region for fluorescent excitation is coupled therefrom into the microscope beam path with the aid of a color filter (called the "excitation filter"). Incoupling into the beam path of the microscope is accomplished by means of a dichroic beam splitter that reflects the excitation light to the sample while allowing the fluorescent light proceeding from the sample to pass largely unimpeded. The excitation light backscattered from the sample is held back with a blocking filter that is nevertheless transparent to the fluorescent radiation. It has been usual for some time to optimally combine mutually coordinated filters and beam splitters into an easily exchangeable modular filter block. The filter blocks are usually arranged in a revolving magazine within the microscope as part of so-called fluorescent incident illuminators, thus making possible rapid and easy exchange.

In confocal scanning microscopy, a detection pinhole can be dispensed with in the case of two-photon (or multi-photon) excitation, since the excitation probability depends on the square of the photon density and thus on the square of the illuminating light intensity, which of course is much greater at the focus than in the adjacent regions. The fluorescent light to be detected therefore very probably originates almost exclusively from the focus region, rendering superfluous any further differentiation, using a pinhole arrangement, between fluorescent photons from the focus region and fluorescent photons from the adjacent regions.

A non-descan arrangement, in which the detection light does not travel to the detector via the beam deflection device (descan arrangement) and the beam splitter for incoupling the illuminating light, but instead is deflected directly to the objective by means of a dichroic beam splitter and detected, is of interest in particular given that the fluorescent photon yield with two-photon excitation is in any case low, since less light is usually lost along this detection light pathway. In addition, scattered components of the detection light make a substantial contribution to the signal in the case of two-photon excitation with descan detection, whereas these play a much lesser role in non-descan detection. Arrangements of this kind are known, for example, from the publication of David W. Piston et al., "Two-photon-excitation fluorescence imaging of three-dimensional calcium-ion activity," Applied Optics, Vol. 33, No. 4, February 1996; and from Piston et al., "Time-Resolved Fluorescence Imaging and Background Rejection by Two-Photon Excitation in Laser Scanning Microscopy," SPIE, Vol. 1640.

U.S. Pat. No. 6,169,289 B1 discloses a microscope with multi-photon excitation in which the detection light proceeding from the sample is detected on the condenser side.

One problem of the known arrangements for non-descan detection is the fact that, the beam splitter for deflecting the detection light out of the microscope beam path occupies a great deal of installation space, especially along the microscope beam path, so that it often cannot be accommodated in ordinary microscope stands. Massive physical modifications to the scanning microscope, and in particular to the microscope stand, are often necessary in order to achieve nonscan detection.

SUMMARY OF THE INVENTION

It is therefore an object of the present invention to propose a scanning microscope that allows a non-descan detection without the need of extra space between the other optical components of the scanning microscope.

The present invention provides a scanning microscope including a light source that emits an illuminating light beam for illumination of a sample, a microscope stand, a beam deflection device, arranged in the microscope stand, for scanning the illuminating light beam over the sample, an objective that focuses the illuminating light beam onto the sample, at least one detector that receives detection light proceeding from the sample, and a Bauernfeind prism, that is arranged between the sample and the detector.

The invention has the advantage of making possible non-descan detection even in microscopes having standard microscope stands.

In a preferred embodiment, the sample defines a sample plane that establishes an illumination side and a transmitted-light side. The Bauernfeind prism can be arranged both on the illumination side and on the transmitted-light side. The invention is especially advantageous in particular for applications that require a transmitted-light-side detector, since the installation space offered in the base of ordinary microscope stands is generally particularly small.

In another preferred embodiment, at least one surface of the Bauernfeind prism has a color-selective coating. This coating can be embodied, for example, as a dichroic or dichromatic filter. When the Bauernfeind prism is arranged on the illumination side, the coating is selected in such a way that the illuminating light beam passes largely unaffected through the prism, whereas the detection light is reflected by the layer and directed to the detector.

In a preferred embodiment, the Bauernfeind prism is achromatic, thereby preventing different beam paths for light of different colors; this is advantageous, especially for an arrangement of the Bauernfeind prism on the illumination side, if the scanning microscope is operated simultaneously in non-descan and descan detection modes.

In an embodiment, the Bauernfeind prism has at least one entry window and at least one exit window, which the detection light strikes at different angles of incidence. In this embodiment, and with the Bauernfeind prism arranged on the illumination side, the illuminating light also strikes the entry and exit windows at different angles of incidence.

In a very particularly preferred embodiment, the detector is arranged inside the microscope stand.

In a variant embodiment, the Bauernfeind prism can be introduced from outside into the illumination and detection beam paths in order to switch over from descan detection to non-descan detection, guidance elements (such as guide rails, slide rails, or a bayonet mount) being provided to make possible easy and reliable introduction and positioning. Also provided are stop elements that define a working position of the Bauernfeind prism and are embodied in such a way that once positioned, the Bauernfeind prism is automatically aligned with respect to the detection beam path, and no further alignment of the Bauernfeind prism is necessary after positioning.

BRIEF DESCRIPTION OF THE DRAWINGS

The subject matter of the invention is depicted schematically in the drawings and will be described below with reference to the Figures, identically functioning elements being labeled with the same reference characters. In the drawings.

DETAILED DESCRIPTION OF THE INVENTION

Figure 1:
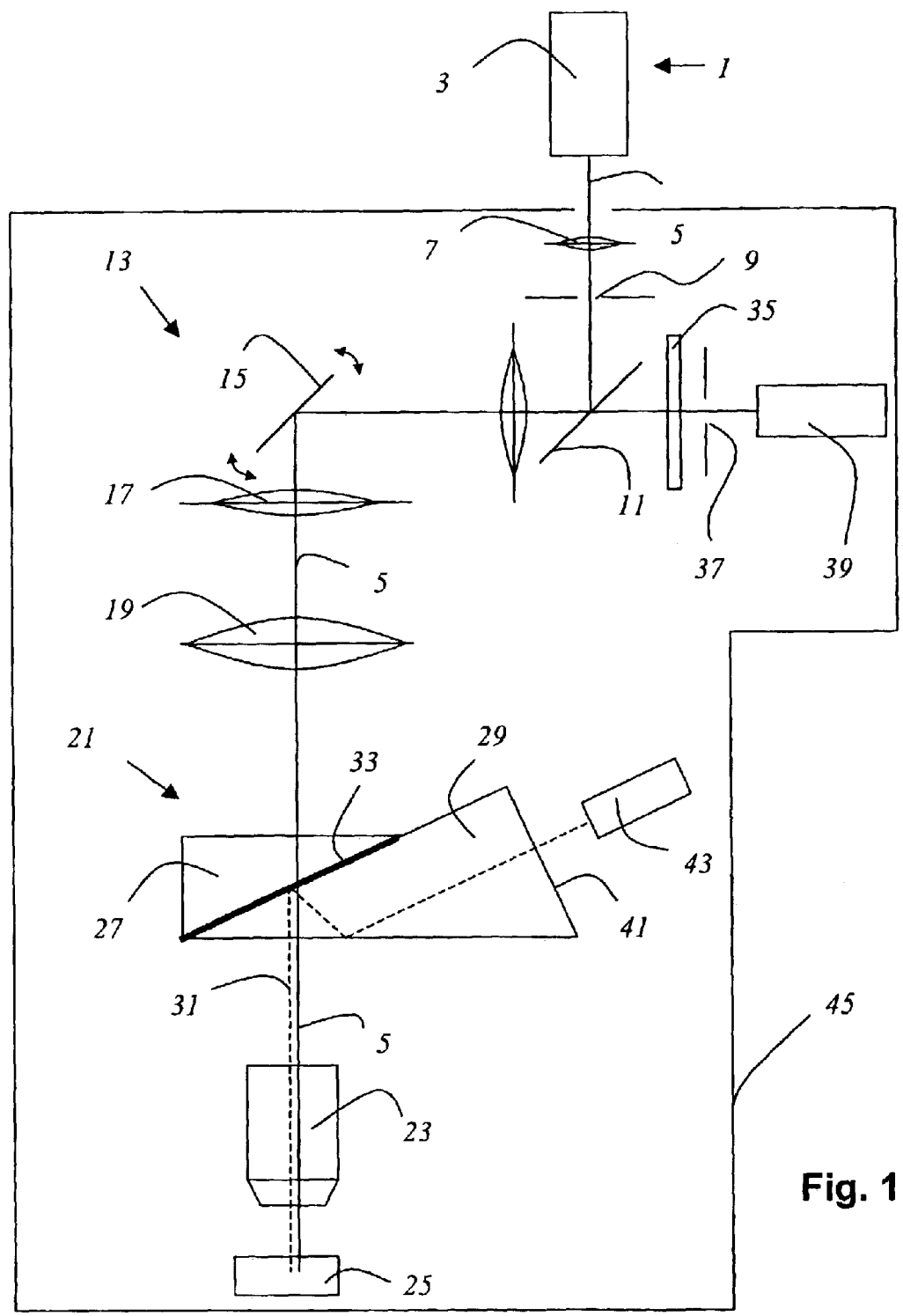
FIG. 1 shows a scanning microscope according to the present invention.

FIG. 1 schematically shows a confocal scanning microscope according to the present invention. Illuminating light beam 5 coming from a light source 1, which is embodied as a mode-coupled titanium-sapphire laser 3, has a wavelength of approx. 800 nm and is focused by optical system 7 onto excitation pinhole 9 and is then reflected by a beam splitter 11 to beam deflection device 13, which contains a gimbal-mounted mirror 15. By means of scanning optical system 17, tube optical system 19, Bauernfeind prism 21, and objective 23, illuminating light beam 5 is guided over or through sample 25. Bauernfeind prism 21, which contains a first prism 27 and a second prism 29 and serves to couple out detection light 31 proceeding from the sample, is located between tube optical system 19 and objective 23. The second prism has, on the side facing the first prism, a dichroic coating 33 that allows illuminating light beam 5 to pass and reflects the wavelength-shifted detection light. With descan detection, detection light 31 travels via beam deflection device 13 back to beam splitter 11, passes through it, through blocking filter 35 that suppresses the residual radiation from the excitation light, and through detection pinhole 37, and then strikes descan detector 39. Bauernfeind prism 21 is preferably removed from the beam path for descan detection. The coating can, however, also be designed so that detection light from a two-photon excitation is reflected to detector 43, and detection light from a one-photon excitation passes unimpeded through the Bauernfeind prism 21. In second prism 29, a total reflection occurs at the hypotenuse surface and the detection light then leaves through exit window 41 and strikes detector 43. It is also conceivable for several total reflections to take place, if it is necessary for the detection light to be transported further; the second prism would need to be enlarged for that purpose. It could also open directly into a light guide. The scanning microscope, with the exception of light source 1, is completely built into a microscope stand 45.

Figure 2:
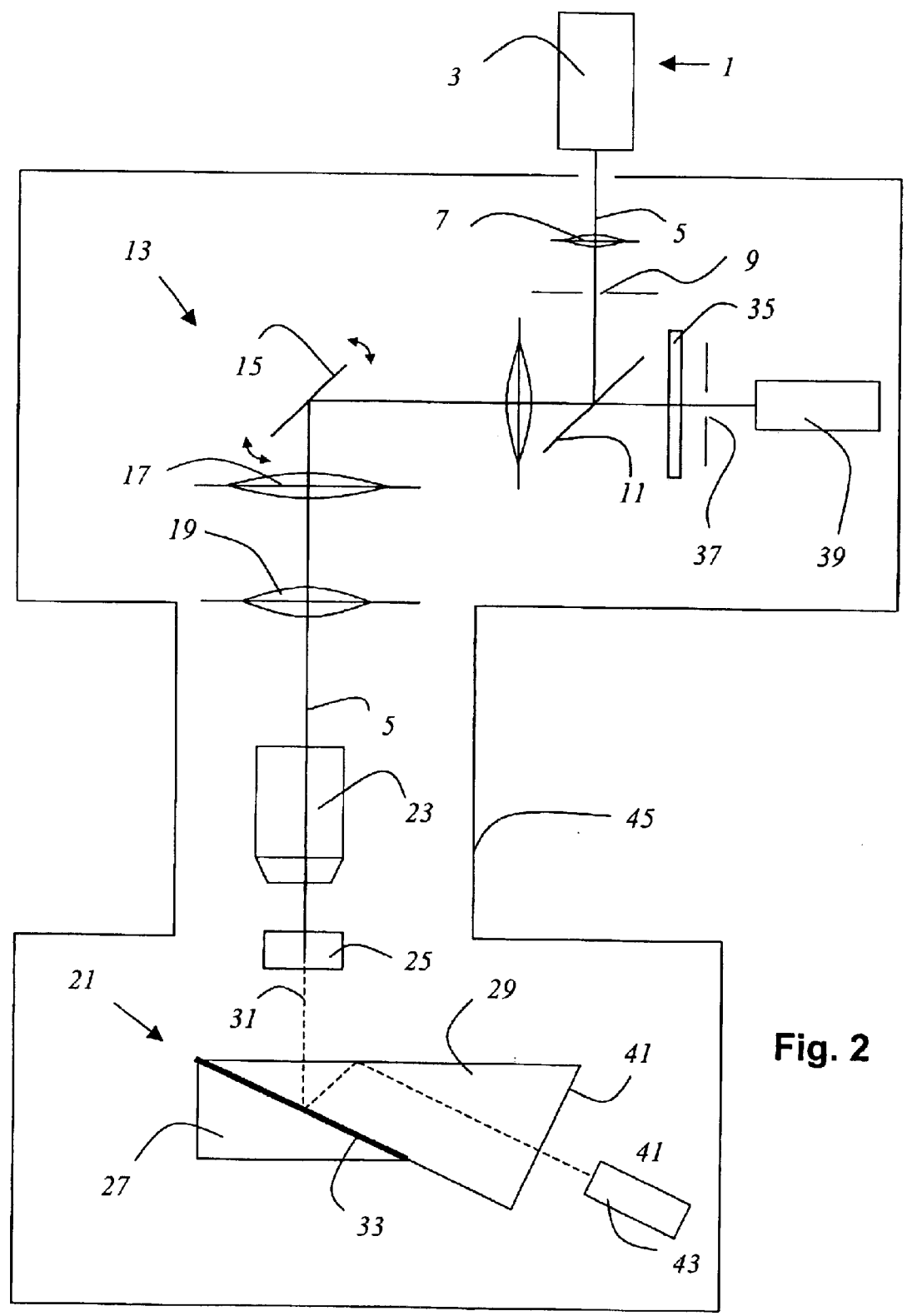
FIG. 2 shows a further scanning microscope according to the present invention.

FIG. 2 shows a further scanning microscope according to the present invention in which Bauernfeind prism 21 and detector 43 are arranged on the transmitted-light side.

The invention has been described with reference to a particular exemplary embodiment. It is self-evident, however, that changes and modifications can be made without thereby leaving the range of protection of the claims below.

What is claimed is:

1. A scanning microscope comprising:

a light source that emits an illuminating light beam for illumination of a sample, a microscope stand, a beam deflection device, arranged in the microscope stand, for scanning the illuminating light beam over the sample, an objective that focuses the illuminating light beam onto the sample, at least one detector that receives detection light proceeding from the sample, and a Bauernfeind prism, that is arranged between the sample and the detector.

2. The scanning microscope as defined in claim 1, wherein the sample defines a sample plane that establishes an illumination side and a transmitted-light side, whereby the Bauernfeind prism is arranged on the illumination side.

3. The scanning microscope as defined in claim 1, wherein the sample defines a sample plane that establishes an illumination side and a transmitted-light side, whereby the Bauernfeind prism is arranged on the transmitted-light side.

4. The scanning microscope as defined in claim 1, wherein at least one surface of the Bauernfeind prism has a color-selective coating.

5. The scanning microscope as defined in claim 1, wherein the Bauernfeind prism is achromatic.

6. The scanning microscope as defined in claim 1, wherein the Bauernfeind prism has an entry window and an exit window, which the detection light strikes at different angles of incidence.

7. The scanning microscope as defined in claim 1, wherein the detector is arranged inside the microscope stand.

* * * * *